United States Patent
Cheng et al.

(10) Patent No.: US 12,509,621 B2
(45) Date of Patent: Dec. 30, 2025

(54) METHOD FOR PREPARING HEAT-CONDUCTIVE CEMENT SLURRY FOR WELL CEMENTATION

(71) Applicants: Southwest Petroleum University, Chengdu (CN); Yao Bai Special Cement Technology Research and Development Co., Ltd., Xi'an (CN)

(72) Inventors: Xiaowei Cheng, Chengdu (CN); Xiaoyue Su, Chengdu (CN); Mingze Li, Chengdu (CN); Panpan Li, Chengdu (CN); Ping Xu, Chengdu (CN); Fei Gao, Chengdu (CN); Cai Jingxuan, Chengdu (CN); Baozhen Tian, Chengdu (CN); Baoyu Lv, Chengdu (CN); Yuanpeng Wu, Chengdu (CN); Kaiyuan Mei, Chengdu (CN); Chunmei Zhang, Chengdu (CN)

(73) Assignees: SOUTHWEST PETROLEUM UNIVERSITY, Chengdu (CN); YAO BAI SPECIAL CEMENT TECHNOLOGY RESEARCH AND DEVELOPMENT CO., LTD., Xi'an (CN)

( * ) Notice: Subject to any disclaimer, the term of this patent is extended or adjusted under 35 U.S.C. 154(b) by 454 days.

(21) Appl. No.: 18/305,910

(22) Filed: Apr. 24, 2023

(65) Prior Publication Data

US 2024/0166936 A1    May 23, 2024

(30) Foreign Application Priority Data

Nov. 22, 2022  (CN) .......................... 202211468526.3

(51) Int. Cl.

| | |
|---|---|
| *C09K 8/467* | (2006.01) |
| *C04B 14/02* | (2006.01) |
| *C04B 24/20* | (2006.01) |
| *C04B 24/26* | (2006.01) |
| *C04B 28/02* | (2006.01) |
| *C04B 40/00* | (2006.01) |
| *C04B 103/40* | (2006.01) |

(52) U.S. Cl.
CPC ............ *C09K 8/467* (2013.01); *C04B 14/024* (2013.01); *C04B 24/20* (2013.01); *C04B 24/2652* (2013.01); *C04B 28/02* (2013.01); *C04B 40/0046* (2013.01); *C04B 2103/408* (2013.01); *C04B 2201/32* (2013.01)

(58) Field of Classification Search
CPC ....... C09K 8/467; C04B 14/024; C04B 24/20; C04B 24/2652; C04B 28/02; C04B 40/0046
See application file for complete search history.

(56) References Cited

U.S. PATENT DOCUMENTS

2016/0326423 A1* 11/2016 Yang ...................... C09K 8/035

FOREIGN PATENT DOCUMENTS

| CN | 109553366 A | * | 4/2019 | ............. C04B 28/04 |
| WO | WO-2016007130 A1 | * | 1/2016 | ............... C09K 8/82 |

OTHER PUBLICATIONS

English machine translation of CN 109553366A. (Year: 2019).*

* cited by examiner

*Primary Examiner* — John E Uselding
(74) *Attorney, Agent, or Firm* — MUNCY, GEISSLER, OLDS & LOWE, P.C.

(57) ABSTRACT

A method for preparing heat-conductive cement slurry for well cementation includes the following steps: S1, uniformly mixing sodium 1-butanesulfonate, sodium dodecyl diphenyl ether disulfonate and polyvinylpyrrolidone to obtain an admixture; S2, dissolving the admixture in deionized water and stirring to obtain a dispersant solution; S3, adding graphite to the dispersant solution and stirring to obtain a graphite dispersion; S4, stirring cement and deionized water in a slurry cup to obtain cement slurry; and S5, mixing and stirring the graphite dispersion and the cement slurry to obtain the heat-conductive cement slurry. The heat-conductive cement slurry can effectively improve the heat conductivity coefficient of set cement, and significantly improve the heat conductivity of the set cement, and has a broad market application prospect.

9 Claims, No Drawings

METHOD FOR PREPARING HEAT-CONDUCTIVE CEMENT SLURRY FOR WELL CEMENTATION

TECHNICAL FIELD

The present invention relates to a method for preparing heat-conductive cement slurry for well cementation, belonging to the field of well cementation of oil-gas wells.

BACKGROUND ART

With the development of social economy, the sustainable development strategy in China is also constantly advancing, people's requirements for environmental protection are constantly increasing, and geothermal energy as a renewable and clean energy has attracted much attention. The development and utilization of geothermal resources in China are in a stage of rapid development, and geothermal wells are used for drilling geothermal steam and geothermal water. A geothermal well cementing material is a hole sealing material pumped into a borehole after hole drilling is completed and setting of a pipe casing is completed, which is between a borehole wall and a geothermal well outer pipe casing, and is a heat transfer medium that transfers geothermal energy to a pipe casing heat exchanger and fluid in a pipe. Therefore, this well cementing material can not only solve the problem of undense contact between geothermal wells and formations, and fill an annular space between the casing and the well wall, thereby enhancing heat exchange between the casing and surrounding rock, but also prevent surface water from infiltrating underground through the borehole to pollute groundwater.

A mining rate of geothermal resources is closely related to the heat conductivity of geothermal well cementing materials, but the commonly used ordinary well-cementing set cement has a relatively low heat conductivity coefficient. In order to improve the mining efficiency of geothermal wells, materials with high conductivity coefficient are usually added when cement slurry is prepared. Heat-conductive particles used to fill well-cementing materials can be mainly divided into three categories: carbon materials, metal materials and inorganic heat-conductive particles. Most carbon elements have good thermal conductivity, such as diamond, graphite, carbon fiber and graphene; heat-conductive metal materials generally have better heat conductivity due to a large number of free electrons, mainly including gold, silver, copper, aluminum, iron and alloys; and inorganic heat-conductive particles mainly include alumina, aluminum nitride, silicon nitride, boron nitride, silicon carbide, magnesium oxide, etc.

Due to a high heat conductivity coefficient of graphite and the fact that it does not chemically react with cement, adding graphite to cement can significantly improve the heat conductivity of set cement. By studying the impact of graphite on the heat conductivity of oil well cement, a graphite-cement composite formula is obtained. Through the test, it can be seen that, in order to improve the heat conductivity coefficient of the set cement, increasing the amount of graphite is the only way. However, too much graphite will not only affect the slurry performances, bring a series of problems to the well cementing process, and even fail to meet the engineering construction requirements of cement slurry, but also reduce the strength of well-cementing materials, resulting in a shortened service life of geothermal wells. How to improve the dispersion of graphite in cement slurry and a series of problems such as the interface cementation between graphite and cement materials have become the focus of research. According to the present invention, by adding an admixture to graphite, heat-conductive cement slurry is prepared, so as to improve the strength of well-cementing cement and ensure that the well-cementing cement slurry has better heat conductivity.

SUMMARY OF THE INVENTION

An object of the present invention is to a method for preparing heat-conductive cement slurry for well cementation. The method is reliable in principle, and simple and convenient to operate. Graphite is modified by adding an admixture compounded by sodium 1-butanesulfonate, sodium dodecyl diphenyl ether disulfonate and polyvinylpyrrolidone, and then a graphite dispersion is added to cement slurry and mixed to form the heat-conductive cement slurry. The high heat conductivity of graphite can play a dominant role and effectively improve the heat conductivity coefficient of set cement, and significantly improve the heat conductivity of the set cement, and has a broad market application prospect.

To fulfill said technical object, the present invention adopts the following technical solutions.

A method for preparing heat-conductive cement slurry for well cementation sequentially includes the following steps:

S1, uniformly mixing sodium 1-butanesulfonate, sodium dodecyl diphenyl ether disulfonate and polyvinylpyrrolidone to obtain an admixture;

S2, dissolving the admixture in deionized water and stirring to obtain a dispersant solution;

S3, adding graphite to the dispersant solution and stirring to obtain a graphite dispersion;

S4, stirring cement and deionized water in a slurry cup to obtain cement slurry; and S5, mixing and stirring the graphite dispersion and the cement slurry to obtain the heat-conductive cement slurry.

Further, in S1, a mass ratio of the 1-butanesulfonate to the sodium dodecyl diphenyl ether disulfonate to the polyvinylpyrrolidone is (40 to 80):(20 to 60):(5 to 20).

Further, in S2, a mass ratio of the deionized water to the admixture is (2000 to 2500):(1 to 5).

Further, in S3, the graphite is ultrafine graphite having a particle size of 1000 to 2000 meshes, and a mass ratio of the graphite to the admixture in the dispersion solution is (500 to 1000) to (1 to 5).

Further, in S4, a mass ratio of the cement to the deionized water is (5000 to 6000):(1000 to 2500).

Further, in S4, the cement is G-grade oil well cement or Portland cement, which are the most commonly used cement in the oil-gas well-cementing construction process.

Further, in S4, conventional admixtures and external additives, such as a dispersant, a water loss reduction agent or a defoamer, also need to be added according to specific needs.

Further, in S5, a mass ratio of the graphite to the cement is (500 to 800):(5000 to 6000).

Further, in S5, the heat-conductive cement slurry is placed into a water bath and cured at a curing temperature of 50 to 80° C. for a curing time of 3 to 15 d to obtain heat-conductive set cement.

Further, the stirring time is 30 to 90 min.

The heat-conductive cement slurry is used in well cementation of oil wells to obtain well cementing cement with good thermal conductivity. At the same time, the heat-conductive cement slurry is also suitable for geothermal well-related well cementing operations, which can not only improve the strength of well-cementing cement, but also increase the thermal conductivity coefficient of well-cementing materials to ensure that the well-cementing cement slurry has better thermal conductivity.

According to the present invention, the wetting of graphite by water is promoted by adding the sodium 1-butanesulfonate, the sodium dodecyl diphenyl ether disulfonate and the polyvinylpyrrolidone, wherein short chain tails and small particle heads of sodium 1-butanesulfonate avoid electrostatic repulsion under the same tails and heads of sodium 1-butanesulfonate, and are better adsorbed on the surface of ultrafine graphite, hindering an agglomeration behavior between graphite; the sodium dodecyl diphenyl ether disulfonate has a large molecular weight, and contains two sulfonate hydrophilic groups and a long tail chain, and after hydrophobic groups of this molecule are adsorbed on the graphite surface, when two graphite with sodium dodecyl diphenyl ether disulfonate are close to each other, their adsorption layers repel each other, thereby forming steric hindrance and preventing graphite agglomeration; and the polyvinylpyrrolidone is a nonionic surfactant, which can significantly reduce the surface tension of a water-graphite dispersion system, its polymer chain can be adsorbed on the graphite surface to form an adsorption layer, and stretches to form steric hindrance in a solvent, and meanwhile, the polyvinylpyrrolidone contains two hydrophilic groups, N group and hydroxyl group, which enhance the hydrophilicity and dispersion stability of the graphite in cement slurry.

Since the heat-conductive cement slurry is added with the graphite dispersion prepared from the sodium 1-butanesulfonate, the sodium dodecyl diphenyl ether disulfonate and the polyvinylpyrrolidone, on the one hand, the introduction of Nat will also reduce the electrostatic repulsion between particles, resulting in the reduction in the dispersibility of graphite in water and increase in the contact surface between graphite particles. In addition, the sodium 1-butanesulfonate and the sodium dodecyl diphenyl ether disulfonate have foaming properties, so excessive addition of sodium 1-butanesulfonate and sodium dodecyl diphenyl ether disulfonate will cause more harmful pores, resulting in a decrease in the structural density of set cement. On the other hand, a dispersion effect of the polyvinylpyrrolidone on the graphite mainly lies in its steric hindrance, which has certain limitations on the dispersibility of graphite.

The heat conductivity of the heat-conductive cement slurry is mainly derived from graphite. The addition of the sodium 1-butanesulfonate, the sodium dodecyl diphenyl ether disulfonate and the polyvinylpyrrolidone mainly improves the dispersibility of graphite in graphite- and cement-based materials. However, the sodium 1-butanesulfonate and the sodium dodecyl diphenyl ether disulfonate have foaming properties, and when their content reaches a saturated concentration of the dispersion, the porosity of the set cement increases with the increase of the sodium 1-butane sulfonate and the sodium dodecyl diphenyl ether disulfonate, resulting in an increase in the thermal resistance of well-cementing materials, and then a decrease in the heat conductivity coefficient of the set cement.

Compared with the prior art, the present invention has the following technical effects:
(1) the heat-conductive cement slurry is scientific and reasonable in design, and the ultrafine graphite itself has excellent heat conductivity, is chemically inert, and does not participate in the hydration reaction of cement, but can promote the hydration process of the cement, make cement hydration more sufficient, make the overall structure of high heat-conductive well-cementing materials more dense, fill pores of the set cement to a certain extent, and reduce the number of harmful pores of high heat-conductive well-cementing materials; and the graphite material is inexpensive and easily accessible;
(2) the production process of the heat-conductive cement slurry is simple, and the composite material prepared has high thermal conductivity coefficient; and
(3) the heat-conductive cement has a wide range of applications, not only for well cementation of oil-gas wells, but also of geothermal wells.

DETAILED DESCRIPTIONS OF THE PREFERRED EMBODIMENTS

The present invention will be further described below according to examples, so that those skilled in the art can understand the present invention. However, it should be clear that the present invention is not limited to the scope of the specific embodiments. For those of ordinary skill in the art, as long as various changes fall within the spirit and scope of the present invention defined and determined by the appended claims, they are all protected.

The experimental methods used in the following examples are conventional methods unless otherwise specified.

The materials, reagents, etc. used in the following examples unless otherwise specified, may be obtained commercially.

Example 1

Heat-conductive cement slurry in the present example has the following composition:
graphite, cement and deionized water according to a mass of 500:5000:3500.

A portion of deionized water is weighed and stirred with graphite, wherein the weighed deionized water accounts for 65% of the total amount of deionized water in the above cement sample formulation; and the mixture is then stirred by u sing a magnetic stirrer for 60 min to obtain a graphite aqueous solution. The remaining deionized water is weighed and poured into a slurry cup, wherein the weighed deionized water accounts for 35% of the total amount of deionized water in the above cement sample formulation; and cement, a dispersant, a water loss reduction agent, a defoamer and other admixture materials are weighed and poured into the slurry cup with the deionized water, and stirred evenly to obtain cement slurry. Finally, the graphite aqueous solution and the cement slurry are poured into the slurry cup and stirred for 50 min to obtain a heat-conductive cement slurry material.

Example 2

Heat-conductive cement slurry in the present example has the following composition:
graphite, admixture, cement and deionized water according to a mass ratio of 550:1:5500:4000, wherein a mass ratio of sodium 1-butanesulfonate to sodium dodecyl diphenyl ether disulfonate to polyvinylpyrrolidone in the admixture is 40:25:20.

The sodium 1-butanesulfonate, the sodium dodecyl diphenyl ether disulfonate and the polyvinylpyrrolidone are mixed evenly to obtain the admixture. A portion of deionized water is weighed to dissolve the admixture, wherein the weighed deionized water accounts for 55% of the total amount of deionized water in the above cement sample formulation; and the mixture is then stirred by using a magnetic stirrer for 40 min to obtain a dispersant solution. The graphite is then weighed and added to the dispersant solution, and then stirred by using a magnetic stirrer for 60 min to obtain a graphite dispersion. The remaining deionized water is weighed and poured into a slurry cup, wherein the weighed deionized water accounts for 45% of the total amount of deionized water in the above cement sample formulation; and cement, a dispersant, a water loss reduction agent, a defoamer and other admixture materials are weighed and poured into the slurry cup with the deionized water, and stirred evenly to obtain cement slurry. Finally, the evenly-dispersed graphite dispersion and the cement slurry are poured into the slurry cup and stirred for 50 min to obtain a heat-conductive cement slurry material.

Example 3

Heat-conductive cement slurry in the present example has the following composition:
graphite, admixture, cement and deionized water according to a mass ratio of 500:3:5000:3500, wherein a mass ratio of sodium 1-butanesulfonate to sodium dodecyl diphenyl ether disulfonate to polyvinylpyrrolidone in the admixture is 45:30:10.

The sodium 1-butanesulfonate, the sodium dodecyl diphenyl ether disulfonate and the polyvinylpyrrolidone are mixed evenly to obtain the admixture. A portion of deionized water is weighed to dissolve the admixture, wherein the weighed deionized water accounts for 65% of the total amount of deionized water in the above cement sample formulation; and the mixture is then stirred by using a magnetic stirrer for 40 min to obtain a dispersant solution. The graphite is then weighed and added to the dispersant solution, and then stirred by using a magnetic stirrer for 60 min to obtain a graphite dispersion. The remaining deionized water is weighed and poured into a slurry cup, wherein the weighed deionized water accounts for 35% of the total amount of deionized water in the above cement sample formulation; and cement, a dispersant, a water loss reduction agent, a defoamer and other admixture materials are weighed and poured into the slurry cup with the deionized water, and stirred evenly to obtain cement slurry. Finally, the evenly-dispersed graphite aqueous solution and the cement slurry are poured into the slurry cup and stirred for 50 min to obtain a heat-conductive cement slurry material.

Example 4

Heat-conductive cement slurry in the present example has the following composition:
graphite, admixture, cement and deionized water according to a mass ratio of 600:5:6000:4000, wherein a mass ratio of sodium 1-butanesulfonate to sodium dodecyl diphenyl ether disulfonate to polyvinylpyrrolidone in the admixture is 60:40:10.

The sodium 1-butanesulfonate, the sodium dodecyl diphenyl ether disulfonate and the polyvinylpyrrolidone are mixed evenly to obtain the admixture. A portion of deionized water is weighed to dissolve the admixture, wherein the weighed deionized water accounts for 55% of the total amount of deionized water in the above cement sample formulation; and the mixture is then stirred by using a magnetic stirrer for 40 min to obtain a dispersant solution. The graphite is then weighed and added to the dispersant solution, and then stirred by using a magnetic stirrer for 60 min to obtain a graphite dispersion. The remaining deionized water is weighed and poured into a slurry cup, wherein the weighed deionized water accounts for 45% of the total amount of deionized water in the above cement sample formulation; and cement, a dispersant, a water loss reduction agent, a defoamer and other admixture materials are weighed and poured into the slurry cup with the deionized water, and stirred evenly to obtain cement slurry. Finally, the evenly-dispersed graphite aqueous solution and the cement slurry are poured into the slurry cup and stirred for 50 min to obtain a heat-conductive cement slurry material.

Example 5

Heat-conductive cement slurry in the present example has the following composition:
graphite, admixture, cement and deionized water according to a mass ratio of 600:3:5500:4000, wherein a mass ratio of sodium 1-butanesulfonate to sodium dodecyl diphenyl ether disulfonate to polyvinylpyrrolidone in the admixture is 54:36:12.

The sodium 1-butanesulfonate, the sodium dodecyl diphenyl ether disulfonate and the polyvinylpyrrolidone are mixed evenly to obtain the admixture. A portion of deionized water is weighed to dissolve the admixture, wherein the weighed deionized water accounts for 55% of the total amount of deionized water in the above cement sample formulation; and the mixture is then stirred by using a magnetic stirrer for 40 min to obtain a dispersant solution. The graphite is then weighed and added to the dispersant solution, and then stirred by using a magnetic stirrer for 60 min to obtain a graphite dispersion. The remaining deionized water is weighed and poured into a slurry cup, wherein the weighed deionized water accounts for 45% of the total amount of deionized water in the above cement sample formulation; and cement, a dispersant, a water loss reduction agent, a defoamer and other admixture materials are weighed and poured into the slurry cup with the deionized water, and stirred evenly to obtain cement slurry. Finally, the evenly-dispersed graphite aqueous solution and the cement slurry are poured into the slurry cup and stirred for 50 min to obtain a heat-conductive cement slurry material.

Example 6

Heat-conductive cement slurry in the present example has the following composition:
graphite, admixture, cement and deionized water according to a mass ratio of 700:4:6000:4500, wherein a mass ratio of sodium 1-butanesulfonate to sodium dodecyl diphenyl ether disulfonate to polyvinylpyrrolidone in the admixture is 60:30:12.

The sodium 1-butanesulfonate, the sodium dodecyl diphenyl ether disulfonate and the polyvinylpyrrolidone are mixed evenly to obtain the admixture. A portion of deionized water is weighed to dissolve the admixture, wherein the weighed deionized water accounts for 55% of the total amount of deionized water in the above cement sample formulation; and the mixture is then stirred by using a magnetic stirrer for 40 min to obtain a dispersant solution. The graphite is then weighed and added to the dispersant solution, and then stirred by using a magnetic stirrer for 60 min to obtain a graphite dispersion. The remaining deionized water is weighed and poured into a slurry cup, wherein the weighed deionized water accounts for 45% of the total amount of deionized water in the above cement sample formulation;

and cement, a dispersant, a water loss reduction agent, a defoamer and other admixture materials are weighed and poured into the slurry cup with the deionized water, and stirred evenly to obtain cement slurry. Finally, the evenly-dispersed graphite aqueous solution and the cement slurry are poured into the slurry cup and stirred for 50 min to obtain a heat-conductive cement slurry material.

In the above examples, a dispersant USZ (Henan Weihui Chemical Co., Ltd.), a water loss reducing agent G33S (Henan Weihui Chemical Co., Ltd.), and an oil well cement defoamer XP-I (Henan Weihui Chemical Co., Ltd.) are added to all formulations. Cement slurry and cured set cement are prepared according to GB/T 19139-2012 "Test Method for Oil Well Cement".

The prepared cement slurry is directly poured into a high-pressure thickener device to test its consistency, and experimental results are shown in Table 1.

TABLE 1

Cement slurry thickening test parameters and results

| Example No. | Temperature (° C.) | Pressure (MPa) | Primary consistency (Bc) | Thickening time (min) |
|---|---|---|---|---|
| 1 | 90 | 50 | 14.7 | 155 |
| 2 | 90 | 50 | 14.4 | 158 |
| 3 | 90 | 50 | 14.6 | 147 |
| 4 | 90 | 50 | 15.3 | 151 |
| 5 | 90 | 50 | 14.4 | 152 |
| 6 | 90 | 50 | 16.1 | 167 |

It can be seen from Table 1 that the initial consistencies of cement slurry in Examples 1 to 6 are 14.7 Bc, 14.4 Bc, 14.6 Bc, 15.3 Bc, 14.4 Bc, 16.1 Bc, and the thickening time can meet the requirements of engineering construction.

By analyzing the experimental results in Table 1, it can be seen that: sodium 1-butanesulfonate, sodium dodecyl diphenyl ether disulfonate and polyvinylpyrrolidone have little effect on the thickening time of cement slurry. The graphite cement slurry mixed with an appropriate amount of sodium 1-butanesulfonate, sodium dodecyl diphenyl ether disulfonate and polyvinylpyrrolidone is thickened at high pressure at 90° C. and 50 MPa, and the initial consistency of the cement slurry is about 15 Bc.

The prepared cement slurry is subjected to density test before and after standing for 2 h, and the experimental parameters and experimental results are shown in Table 2.

TABLE 2

Cement slurry density test parameters and results

| Example No. | Initial density/ (g/cm³) | Density after standing for 2 h | | Free fluid/ (mL) |
| | | Upper-layer density/(g/cm³) | Lower-layer density/(g/cm³) | |
|---|---|---|---|---|
| 1 | 1.800 | 1.790 | 1.808 | 1 |
| 2 | 1.780 | 1.780 | 1.780 | 0 |
| 3 | 1.770 | 1.770 | 1.770 | 0 |
| 4 | 1.770 | 1.770 | 1.770 | 0 |
| 5 | 1.770 | 1.770 | 1.770 | 0 |
| 6 | 1.770 | 1.770 | 1.770 | 0 |

It can be seen from Table 2 that the slurry properties such as settlement stability and fluidity of graphite cement slurry after the addition of a surfactant have been improved; and after adding an appropriate amount of sodium 1-butanesulfonate, sodium dodecyl diphenyl ether disulfonate and polyvinylpyrrolidone, the cement slurry after standing for 2 h has no free liquid, which effectively improves the settlement stability of graphite-cement slurry. There are three reasons for this result: 1, although graphite itself is hydrophobic, the addition of sodium 1-butanesulfonate, polyvinylpyrrolidone and sodium dodecyl diphenyl ether disulfonate can promote the wetting of graphite by water, short chain tails and small particle heads of sodium 1-butanesulfonate avoid electrostatic repulsion under the same tails and heads of sodium 1-butanesulfonate, and are better adsorbed on the surface of ultrafine graphite, hindering an agglomeration behavior between graphite; 2, the sodium dodecyl diphenyl ether disulfonate molecule contains two sulfonate hydrophilic groups which have the properties of good hydrophilicity, strong adsorption capacity, strong connection force and heterocyclic structure, and a long hydrophobic alkyl chain which is adsorbed on the graphite surface to form a steric hindrance between graphite sheet layers, thereby hindering the agglomeration behavior of graphite; and 3, the polyvinylpyrrolidone is a polymer nonionic surfactant which has a polymer chain that can be adsorbed on the graphite surface to form an adsorption layer, and the polyvinylpyrrolidone contains two hydrophilic groups, N group and hydroxyl group, which can enhance the hydrophilicity and dispersion stability of graphite in the cement slurry.

The prepared cement slurry is tested with an Az cone and a six-speed rotational viscometer device for fluidity and rheology respectively, and the experimental results are shown in Table 3.

TABLE 3

Fluidity and rheology test results of cement slurry

| Example No. | Fluidity/ (cm) | Rheological index n | Consistency coefficient $K/(Pa \cdot s^n)$ |
|---|---|---|---|
| 1 | 20.6 | 0.8037 | 0.3671 |
| 2 | 22.0 | 0.8103 | 0.2142 |
| 3 | 22.5 | 0.7217 | 0.1898 |
| 4 | 23.5 | 0.7947 | 0.3133 |
| 5 | 23.9 | 0.8341 | 0.2578 |
| 6 | 23.0 | 0.8374 | 0.1648 |

It can be seen from Table 3, from the comparison of the fluidity, rheological index and consistency coefficient of Examples 1 to 4, the incorporation of a surfactant can improve the properties of cement slurry and increase the fluidity of the cement slurry, and the improvement effect on rheological properties of the cement slurry increases first and then decreases with the increase of surfactant content. When an appropriate amount of surfactant is added, the slurry properties of the composite material first increase and then decrease with the increase of a ratio of sodium 1-butanesulfonate to sodium dodecyl diphenyl ether disulfonate to polyvinylpyrrolidone. There are four reasons for this result: 1, hydrophobic tails of the sodium 1-butanesulfonate, the sodium dodecyl diphenyl ether disulfonate and the polyvinylpyrrolidone have a strong hydrophobic attraction with the graphite surface, and their hydrophilic "heads" turn to a liquid phase to form hydrogen bonds, so that graphite particles are dispersed in water, and the negatively charged hydrophilic "heads" can also disperse graphite particles by electrostatic repulsion; 2, the sodium 1-butanesulfonate and the sodium dodecyl diphenyl ether disulfonate are anionic surfactants, and both show a synergistic dispersion effect, but when the sodium 1-butanesulfonate and the sodium dodecyl diphenyl ether disulfonate have a saturation concentration in a dispersion solution, and the amounts of the sodium 1-butanesulfonate and the sodium dodecyl diphenyl ether disulfonate are continued to increase after this concentration value is increased, such that surfactant molecules will be bonded to form micelles through hydrophobic chain ends, resulting in a surfactant concentration between graphite particles being smaller than a surfactant concentration in the solution, and the resulting osmotic action forces the solvent to flow out from the particles, and the flow of the solvent attracts the particles together, increasing the viscosity of the graphite dispersion; 3, when the amounts of the sodium 1-butanesulfonate and the sodium dodecyl diphenyl ether disulfonate are too much, the introduced Na will also reduce the electrostatic repulsion between particles, so that the dispersibility of graphite in water is reduced; and 4, the polyvinylpyrrolidone is a polymer nonionic surfactant, and when this molecule is adsorbed on the graphite surface, it may produce a variety of configurations; when two graphite with polyvinylpyrrolidone are close to each other, their adsorption layers are only squeezed and cannot penetrate each other, thereby forming steric hindrance and preventing graphite agglomeration and caking; but when the amount of the polyvinylpyrrolidone in the dispersion exceeds its saturated concentration, the polyvinylpyrrolidone molecules will be bonded through hydrophobic chains to form micelles, thereby increasing the viscosity of the system and reducing the dispersibility of graphite in water. From the comparison of the fluidity, rheological index and consistency coefficient of Examples 3, 5 and 6, it can be seen that with the increase of graphite content, the rheological properties of the cement slurry are improved, while the fluidity of the cement slurry gradually decreases, but the fluidity of all examples can still meet the requirements of engineering construction.

The prepared cement stone is tested with a TYE-300B pressure testing machine and a KDR-II (transient fast hot-wire method) thermal conductivity tester, and the experimental results are shown in Table 4.

tration, the hydrophobic tails of the sodium 1-butanesulfonate, the sodium dodecyl diphenyl ether disulfonate and the polyvinylpyrrolidone form micelles, increasing the viscosity of the system. In addition, Nat will reduce the electrostatic repulsion between particles, resulting in a decrease in the stability of the graphite dispersion. Since graphite is of a sheet-layer structure in which layers are bonded by van der Waals forces, and when it accumulates in cement-based materials, the strength of heat-conductive set cement is significantly reduced. Moreover, the sodium 1-butanesulfonate and the sodium dodecyl diphenyl ether disulfonate have foaming properties, and excessive addition of the sodium 1-butanesulfonate and the sodium dodecyl diphenyl ether disulfonate will increase the porosity and harmful pores of the set cement; and by comparing the experimental results in Table 3 and Table 4, a mass ratio of the surfactant to the graphite is optimized. By changing the graphite content to further screen out the optimal formula of the heat-conductive cement, it can be seen from the test results in Example 3, 5 and 6 that with the increase of graphite content, the compressive strength and thermal conductivity of the set cement show a gradual increase trend. This is because the graphite has high thermal conductivity and is an inert material, which does not participate in the cement hydration reaction, but can promote the cement hydration process, making cement hydration more complete, and generating more hydration products. Therefore, the whole set cement is more dense, which reduces the porosity of the composite material, and can improve the mechanical properties and thermal conductivity of the set cement to a certain extent.

The invention claimed is:

1. A method for preparing heat-conductive cement slurry for well cementation, sequentially comprising the following steps:

S1, uniformly mixing sodium 1-butanesulfonate, sodium dodecyl diphenyl ether disulfonate and polyvinylpyrrolidone to obtain an admixture;

TABLE 4

Mechanical property and thermal conductivity test results of set cement

| Example No. | Compressive strength (MPa) | | | Heat conductivity coefficient (W/(mK)) | | |
|---|---|---|---|---|---|---|
| | Day 3 | Day 7 | Day 14 | Day 3 | Day 7 | Day 14 |
| 1 | 11.22 | 13.37 | 15.13 | 1.8034 | 1.8737 | 1.8753 |
| 2 | 12.76 | 16.63 | 18.38 | 1.9165 | 1.9987 | 2.0572 |
| 3 | 13.69 | 17.28 | 20.54 | 2.0698 | 2.1512 | 2.1644 |
| 4 | 12.89 | 16.92 | 19.54 | 1.9096 | 1.9501 | 1.9733 |
| 5 | 15.80 | 18.07 | 21.14 | 2.1333 | 2.1638 | 2.2154 |
| 6 | 16.32 | 23.88 | 26.42 | 2.3385 | 2.3552 | 2.4098 |

From the comparison of Examples 2 to 4 with Example 1, it can be seen that the addition of a graphite dispersion dispersed by the sodium 1-butanesulfonate, the sodium dodecyl diphenyl ether disulfonate and the polyvinylpyrrolidone to the cement slurry can improve the compressive strength and thermal conductivity of set cement, and the improvement effects on the mechanical properties and thermal conductivity of the set cement show a trend of first increasing and then decreasing with the increase of surfactant content. This is because when the amount of surfactant in the graphite dispersion reaches saturation, the graphite dispersion has the best stability, which effectively prevents the accumulation of graphite in cement-based materials. When the surfactant is added beyond the saturated concen- S2, dissolving the admixture in deionized water and stirring to obtain a dispersant solution;

S3, adding graphite to the dispersant solution and stirring to obtain a graphite dispersion;

S4, stirring cement and deionized water in a slurry cup to obtain cement slurry; and S5, mixing and stirring the graphite dispersion and the cement slurry to obtain the heat-conductive cement slurry.

2. The method for preparing the heat-conductive cement slurry for well cementation according to claim 1, wherein in S1, a mass ratio of the 1-butanesulfonate to the sodium dodecyl diphenyl ether disulfonate to the polyvinylpyrrolidone is (40 to 80):(20 to 60):(5 to 20).

3. The method for preparing the heat-conductive cement slurry for well cementation according to claim 1, wherein in S2, a mass ratio of the deionized water to the admixture is (2000 to 2500):(1 to 5).

4. The method for preparing the heat-conductive cement slurry for well cementation according to claim 1, wherein in S3, the graphite is ultrafine graphite having a particle size of 1000 to 2000 meshes, and a mass ratio of the graphite to the admixture in the dispersion solution is (500 to 1000) to (1 to 5).

5. The method for preparing the heat-conductive cement slurry for well cementation according to claim 1, wherein in S4, a mass ratio of the cement to the deionized water is (5000 to 6000):(1000 to 2500).

6. The method for preparing the heat-conductive cement slurry for well cementation according to claim 1, wherein in S4, the cement is G-grade oil well cement or Portland cement.

7. The method for preparing the heat-conductive cement slurry for well cementation according to claim 1, wherein in S4, a conventional admixture and an external additive are added according to specific needs.

8. The method for preparing the heat-conductive cement slurry for well cementation according to claim 1, wherein in S5, a mass ratio of the graphite to the cement is (500 to 800):(5000 to 6000).

9. The method for preparing the heat-conductive cement slurry for well cementation according to claim 1, wherein in S5, the heat-conductive cement slurry is placed into a water bath and cured at a curing temperature of 50 to 80° C. for a curing time of 3 to 15d to obtain heat-conductive set cement.

\* \* \* \* \*